A. J. MARSCHALL.
RENNET PACKAGE AND METHOD OF MAKING SAME.
APPLICATION FILED JAN. 19, 1912.

1,038,920.

Patented Sept. 17, 1912.

Witnesses:—
A. Borkenhagen
A. G. Dimond.

Inventor
Adolf J. Marschall,
By Wilhelm, Parker & Hard,
Attorneys.

UNITED STATES PATENT OFFICE.

ADOLF J. MARSCHALL, OF MADISON, WISCONSIN.

RENNET-PACKAGE AND METHOD OF MAKING SAME.

1,038,920.     Specification of Letters Patent.     Patented Sept. 17, 1912.

Application filed January 19, 1912. Serial No. 672,187.

*To all whom it may concern:*

Be it known that I, ADOLF J. MARSCHALL, a citizen of the United States, residing at Madison, in the county of Dane and State of Wisconsin, have invented a new and useful Improvement in Rennet-Packages and Method of Making Same, of which the following is a specification.

Rennets or calf stomachs, particularly Bavarian rennets, are used by makers of Swiss cheese in the preparation of an extract or solution containing the active principle or curdling ferment of the rennets and usually designated "home made rennet." In preparing this solution or extract the cheese maker first removes the fleshy parts of the calf stomachs which parts are of no value, because they contain but little of the rennet ferment and are liable to contain objectionable ingredients or germs, and then uses from day to day as much of the calf stomach as he requires for present use. As these stomachs are very uneven in size and in strength of ferment, the solution prepared from them differs greatly in strength from day to day and this results in uneven fermentation and great variations in the quality of the product.

The object of this invention is to produce a rennet package in which the rennet ferment is uniformly distributed so that a certain fractional part of this package will contain a certain corresponding quantity of the ferment, thereby enabling the cheese maker to produce an extract or solution of a certain strength by using a certain corresponding fractional part of this rennet package.

Figure 1:
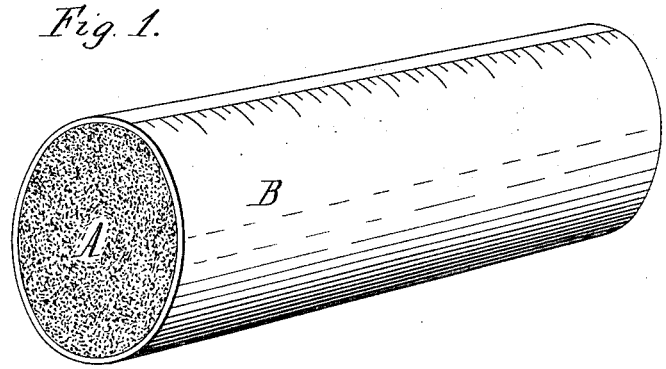
Figure 2:
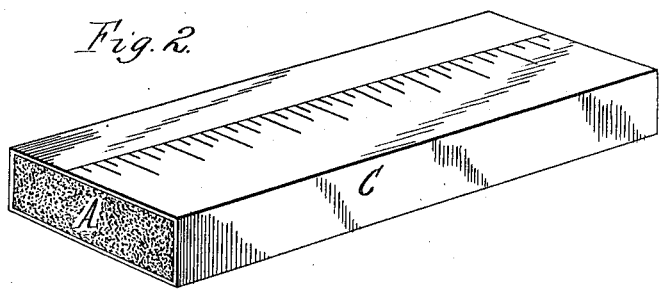

In the accompanying drawing: Figure 1 represents a perspective view of a cylindrical package, and Fig. 2 a similar view of a four-sided package.

Like reference characters refer to like parts in the several figures.

In preparing this package the fleshy portions of the stomachs are first removed. The remaining thin portions are then minced or cut fine and this minced product of a large number of stomachs, preferably several thousand, is thoroughly mixed so that the resulting minced and mixed material is a uniform blend of the entire number of stomachs used. This minced and mixed material is then compacted in the form of a body or bar under considerable pressure, which body or bar may be cylindrical or four-sided. The rennet material is forced into a casing or envelop of heavy paper, cardboard or other suitable material and the casing is provided with marks or graduations indicating certain convenient divisions of the body or bar. For illustration, the body or bar may be made to contain the equivalent of ten rennets and be about twelve inches long, and if cylindrical about one and one-half inches in diameter. The casing may be marked with a longitudinal scale or graduation having units which correspond with one average rennet and these units may be subdivided into quarters or other convenient fractions. When the cheesemaker wishes to use a quantity of this rennet he cuts from the body or bar a piece suitable for his purpose, removes the casing or envelop from the piece so cut off and then uses the rennet material in the usual way. As the rennet material is uniform from end to end of the body, bar or package, the cheesemaker will produce with great convenience and certainty solutions of practically uniform strength by using in each case a corresponding measured quantity of material.

A small quantity of salt or other preservative or useful ingredient may be mixed with the rennet material, if desired.

In the drawings, A represents the minced, mixed and compacted rennet material, B a cylindrical envelop, and C a four-sided envelop.

I claim as my invention:

1. The herein described method of producing a body of rennet material containing the rennet ferment in uniform distribution, which method consists in mincing the rennet-containing portions of a large number of calf stomachs, mixing the minced material thoroughly, and compacting the minced and mixed material under pressure, substantially as set forth.

2. A body of rennet material containing the rennet ferment in uniform distribution, such body consisting of the compacted, minced and mixed rennet-containing portions of a large number of calf stomachs, substantially as set forth.

3. A body of rennet material containing the rennet ferment in uniform distribution, such body consisting of the compacted, minced and mixed rennet-containing portions of a large number of calf stomachs, and an enveloping casing, substantially as set forth.

Witness my hand this 13th day of January, 1912.

ADOLF J. MARSCHALL.

Witnesses:
E. B. WESTCOTT,
E. C. DOHR.